S. F. DOUGLASS.
ROAD DRAG.
APPLICATION FILED JAN. 31, 1917.
1,265,181.
Patented May 7, 1918.
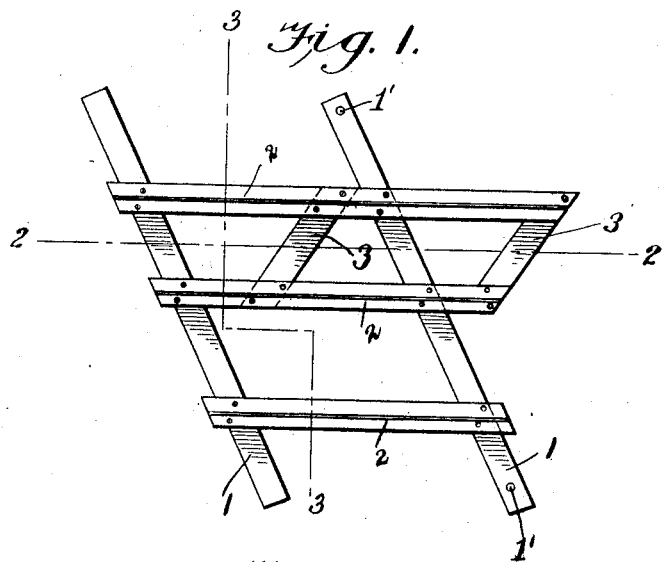
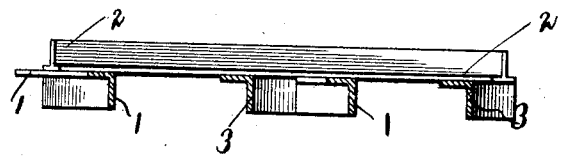
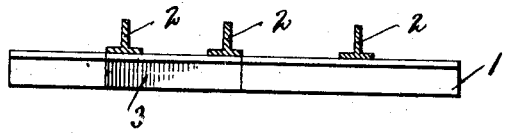
INVENTOR
S. F. Douglass.
BY Victor J. Evans
ATTORNEY
WITNESSES

UNITED STATES PATENT OFFICE.

SAMUEL F. DOUGLASS, OF MILLERSTOWN, PENNSYLVANIA.

ROAD-DRAG.

1,265,181. Specification of Letters Patent. Patented May 7, 1918.

Application filed January 31, 1917. Serial No. 145,729.

*To all whom it may concern:*

Be it known that I, SAMUEL F. DOUGLASS, a citizen of the United States, residing at Millerstown, in the county of Perry and State of Pennsylvania, have invented new and useful Improvements in Road-Drags, of which the following is a specification.

This invention relates to road drags and it consists in the novel features hereinafter described and claimed.

An object of the invention is to provide in conjunction with a road drag having blades adapted to move material from the side edge of a road toward a center thereof with means for moving material into the rut of the road whereby ample material is conveyed into the rut to completely fill the same thus leaving the road, after it has been dragged without depression along the line at which the rut previously existed.

With the above object in view the drag comprises a plurality of parallel blades disposed at an acute angle to the line of draft of the drag and adapted to encounter the soil at the side of a road and move the same toward the center thereof as the drag is moved along the road. In advance of each of the said blades is located a shorter blade also disposed at an acute angle with relation to the line of draft of the drag and disposed approximately transversely to the primary blade which is located behind the same. The last mentioned shorter blade is adapted to move some of the material from the intermediate portion of the road and deposit the same in the rut and thus the rut is partially filled and the material which is moved by the longer blade passes into the rut and completely fills the same.

In the accompanying drawing:—

Figure 1 is a top plan of the drag;

Fig. 2 is a sectional view of the same taken on the line 2—2 of Fig. 1.

Fig. 3 is a similar view taken on the line 3—3 of Fig. 1.

The drag comprises metallic blades 1 which are disposed parallel with each other and at an acute angle to the line of draft of the drag. The said blades 1 are connected together by means of cross bars 2 which may be of wood or metal. The blades 1 are parallel with each other and are relatively long. Some of the cross bars 2 are extended in front of the forward surface of the forward blade 1 and relatively short blades 3 are carried by the last mentioned bars. A short blade 3 is carried in advance of each of the long blades 1 and the said short blades are disposed at acute angles with relation to the line of the draft of the drag, and approximately transversely with relation to the long blades.

By reference to Fig. 1 of the drawing it will be observed that the forward long blade 1 is provided at its end portion with openings 1′ and the said openings are located beyond the end of the forward short blade and behind the forward end of the forward short blade 3. A draft appliance (not shown) as for instance a chain may be connected with the forward long blade 1 at the openings 1′ and consequently the side portions of the chain are held spaced apart so that the forward short blade will not come in contact with the same as the implement is being moved in a forward direction and therefore the presence of the forward short blade upon the drag does not interfere with the draft appliance.

In operation the drag is drawn along the surface of the road so that the short blades 3 move over or along a rut in the road. The said short blades encounter the material at the intermediate portion of the road and move the same in an outward direction into the rut. The outer ends of the longer blades encounter the material at the side edges of the road and move the same inwardly over the rut and toward the center of the road bed.

Thus it will be seen that the action of the short blades upon the material is such as to move some of the material into the rut and partially fill the same. The action of the longer blades upon the material is such as to move the said material from the side edges of the road toward the center thereof and across the rut and completely fill the rut. Hence it will be seen that after the drag is moved along the road the rut is completely filled and there is no depression left at the rut by reason of the fact that it is completely filled. Hence a smooth and even road surface is provided by the action of the drag thereon.

Having described the invention what is claimed is:—

A drag especially adapted to be used for filling and packing material in the rut of a road comprising a frame, a relatively long advance blade attached to the frame and disposed at an acute angle to the line of draft thereof, and a relatively short blade attached to the frame and located in front of the long advance blade and disposed at an acute angle to the line of draft of the frame and having its longitudinal dimension disposed at an angle to the longitudinal dimension of the long advance blade, said short blade having one end positioned at a point approximately midway between the ends of the long blade and the end portions of the long blade extending beyond the ends of the short blade, both of said blades being disposed approximately at equal angles to the line of draft of the frame, the parts being so arranged that when in operation the short blade will direct the hummock at one side of a rut into the rut and the long blade will direct the material of the hummock at the opposite side of the rut into the rut and simultaneously operate upon the material which is in the rut and which is located beyond the opposite ends of the short blade, the long blade being provided at points beyond the ends of the short blade with openings in which a draft appliance may be connected with the long blade at points behind the forward end of the short blade.

In testimony whereof I affix my signature.

SAMUEL F. DOUGLASS.